Patented Nov. 13, 1951

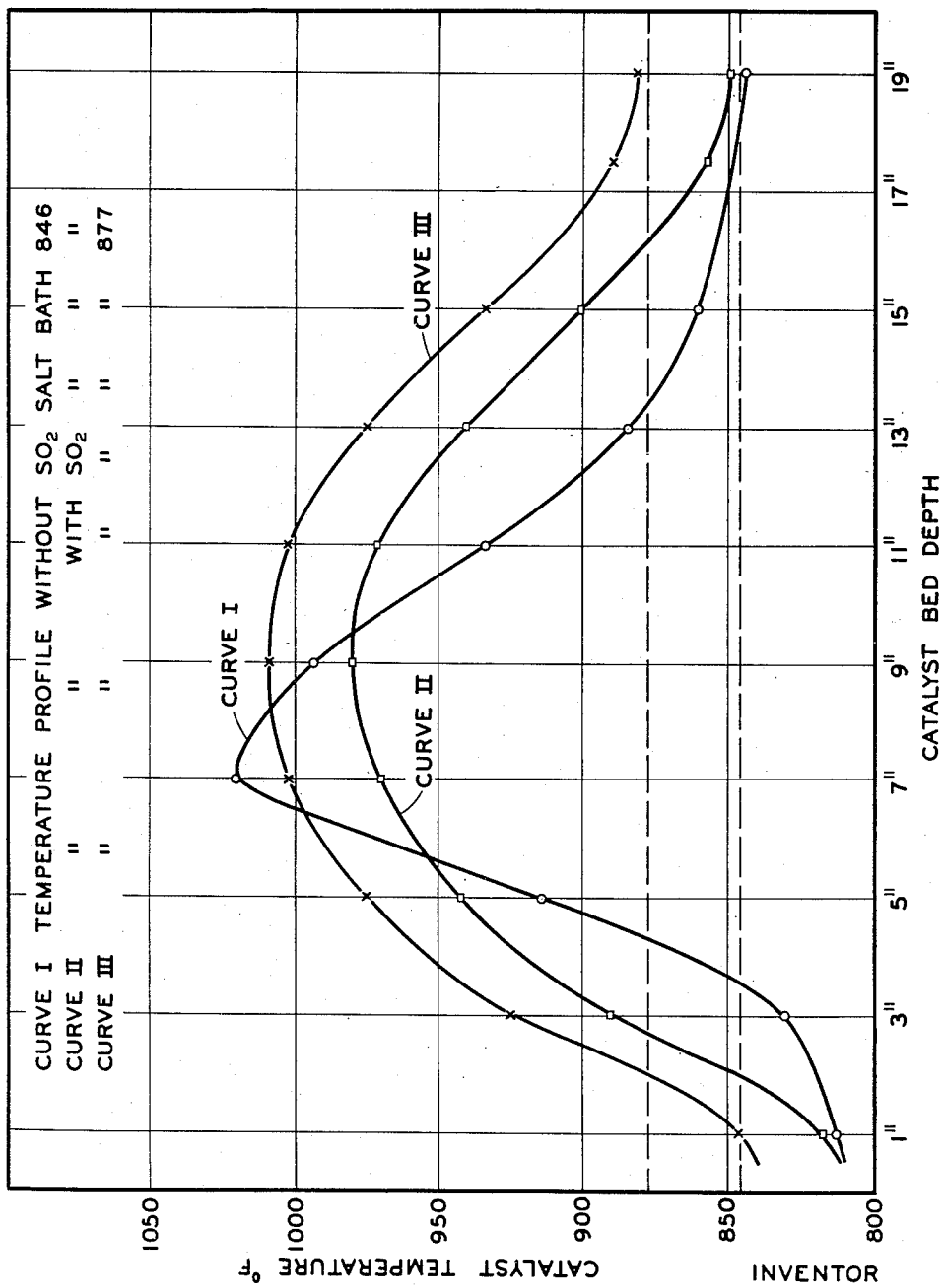

2,574,511

UNITED STATES PATENT OFFICE 2,574,511

OXIDATION OF ORGANIC COMPOUNDS

William G. Toland, Jr., Richmond, Calif., assignor to California Research Corporation, San Francisco, Calif., a corporation of Delaware Application March 18, 1950, Serial No. 150,538

7 Claims. (Cl. 260—342)

This invention relates to a process for the production of oxygenated organic compounds in a reaction catalyzed by a vanadium oxide catalyst, and, more particularly, to a method for controlling catalyst temperature during the oxidation.

Vanadium oxide catalyst, especially vanadium pentoxide catalysts, are well recognized oxidation catalysts and are widely used in commercial processes for producing oxygenated organic compounds from hydrocarbons and partially oxidized hydrocarbons. These catalysts are ordinarily employed in processes in which a vaporized organic compound and a stoichiometric excess of an oxygen-containing gas are passed through a bed of the catalyst at temperatures in the range about 800° F. to 1200° F. Vanadium oxide catalysts, especially freshly prepared catalysts which have been in use in an oxidation process for a relatively short period up to about three months, exhibit temperature characteristics in the catalyst bed which pose a difficult problem of catalyst temperature control. Observations of the temperatures existing at different levels in the catalyst bed during the oxidation reaction indicate that a rather sharply defined peak temperature is attained during the passage of the reactants through a relatively narrow segment of the catalyst bed. When the temperature profile of the catalyst bed is determined by plotting catalyst temperatures at different depths in the bed against bed depth, it is not uncommon to encounter abrupt temperature rises of 200 Fahrenheit degrees or more in a segment of the catalyst bed that measures no more than 3 to 5 inches. A definite "hot spot" exists within this narrow segment of the catalyst bed. Catalyst temperatures in the portions of the bed traversed by the reactant mixture before and after the hot spot are relatively low, indicating that a considerable portion of the catalyst is not being used effectively in the reaction. These temperatures cannot be raised without concurrently raising the temperature of the hot spot above the maximum tolerable catalyst temperature which is somewhat in excess of 1200° F. The existence of such a hot spot in a relatively narrow segment of the catalyst bed suggests that the greater portion of the oxidation reaction is occurring in this narrow segment with consequent release of the exothermic heat of reaction in a zone of relatively small area. The catalyst is commonly retained in tubes of relatively small diameter which are in indirect heat exchange with a circulating heat exchange fluid adapted to conduct the exothermic heat of reaction away from the region in which it is released and so to maintain the temperature of the catalyst at all points in the bed below some predetermined maximum temperature. Release of the exothermic heat of reaction in a narrow segment of the catalyst bed makes it very difficult to transfer this heat away from the concentrated zone of exothermic reaction with sufficient rapidity to maintain the temperature of the catalyst in that zone below the maximum tolerable temperature. Even with the most efficient heat exchange apparatus, it is frequently found necessary to cut back on the feed rate of the reactant mixture to the catalyst bed in order to prevent excessive hot spot temperatures which may result in fusion of the catalyst, total oxidation and destruction of the product, and corrosive and structural damage to equipment as a result of excessive heat release associated with total oxidation. These cut backs in feed rate are of such frequency and duration as to have an appreciable and significant effect on the total through-put of the catalytic oxidation unit. As the catalyst ages in the reaction system, for example, when it has been in use for a period of three months or more, the temperature profile of the catalyst bed undergoes a reasonable degree of modification and the peak temperature is not so abruptly reached. This fact is consistent with the commercial practice of operating with a fresh catalyst charge at reduced feed rates for a period up to about three months until the catalyst is broken in. The break-in period is simply a period during which the catalyst undergoes a modification such that the high temperature area of the catalyst bed extends over a greater proportion of its depth. During the break-in period of the catalyst, it is also customary to bring the heat exchange fluid into contact with the catalyst tubes at substantially lower temperatures than are employed after several months of operation. While this expedient is necessary in order to control the hot spot maximum temperature, it has the effect of cooling the portions of the catalyst bed before and after the hot spot, thus tending to accentuate the peak temperature in the catalyst temperature profile.

It is an object of this invention to provide a method for smoothing the temperature profile of a vanadium oxide catalyst bed employed in catalyzing the oxidation of organic compounds by an oxygen-containing gas.

It is a further object of this invention to provide a method for avoiding the development of hot spots having an excessively high temperature and for maintaining a relatively smooth temperature profile in a vanadium oxide catalyst bed employed in catalyzing the oxidation of organic compounds with an oxygen-containing gas during the break-in period of the catalyst.

It is a further object of this invention to provide a method for increasing the capacity of an oxidation reactor in which organic compounds are oxidized in vapor phase by an oxygen-containing gas during the passage of the organic compounds and the gas through a bed of vanadium oxide catalyst.

Other and further objects of the invention will be apparent from the following detailed description of the invention.

It has now been discovered that the temperature profile developed in a vanadium oxide catalyst bed during the oxidation of hydrocarbons or partially oxidized hydrocarbons in vapor phase with an oxygen-containing gas present in stoichiometrically excessive amounts by contacting the vaporized organic compounds and the oxygen-containing gas with the vanadium oxide catalyst can be substantially smoothed by contacting the hydrocarbons and oxygen-containing gas with the catalyst in the presence of a small amount of sulfur dioxide. It has also been found that the introduction of low boiling sulfur compounds such as $C_1$ to $C_5$ mercaptans, organic sulfides and disulfides, heterocyclic organic sulfur compounds such as thiophenes and hydrogenated thiophenes, hydrogen sulfide, sulfur trioxide and carbon disulfide into the reactant mixture also causes a smoothing of the temperature profile of the catalyst bed. Since organic oxidations over a vanadium oxide catalyst commonly employ large stoichiometric excesses of oxygen, it is thought that these latter sulfur compounds are effective by reason of their conversion to sulfur dioxide in the reaction zone.

Pursuant to the invention, from about 0.01% to about 15% by weight and preferably 0.5% to about 1.0% by weight of sulfur dioxide based on the organic material undergoing oxidation is introduced into the mixture of vaporized organic material and oxygen-containing gas en route to contact with the vanadium oxide catalyst. The amount of sulfur dioxide employed does not appear to be critical except that it should be in excess of 0.01% by weight based on the organic compound charged to the reaction zone and it can be employed to advantage only in reactions in which a substantial stoichiometric excess of oxygen is present in the reactant mixture.

Specific oxidations in which an organic compound and an oxygen-containing gas are passed through a bed of a vanadium oxide catalyst producing a sharply defined temperature peak in a relatively narrow segment of the catalyst bed and which may be substantially benefited by the employment of sulfur dioxide to smooth the temperature profile of the catalyst bed pursuant to the invention, include the oxidation of benzene to maleic acid, the oxidation of toluene to benzoic acid, the oxidation of naphthalene, ortho xylene, phenanthrene, and indene, the phthalic anhydride, the oxidation of durene to pyromellitic anhydride, the oxidation of nicotine to nicotinic acid, the oxidation of normal butenes and butadiene to maleic acid, and the oxidation of cyclopentane, cyclopentene, or cyclopentadiene to maleic acid. The oxidation of partially oxidized hydrocarbons such as benzaldehyde to benzoic, of other aldehydes to acids, of ortho toluic acid to phthalic anhydride, may also be benefited by the employment of sulfur dioxide pursuant to the invention when these oxidations are catalyzed by vanadium oxide catalysts.

The employment of sulfur dioxide to smooth the temperature profile of a bed of vanadium oxide catalyst in the manner above described is particularly useful in vapor phase oxidations of cyclic hydrocarbons, especially aromatic hydrocarbons.

The employment of sulfur dioxide is particularly advantageous in oxidation reactions catalyzed by vanadium oxide which are conducted at temperatures in the range about 800° F. to 1200° F. Sulfur dioxide, however, is also useful in vapor phase reactions conducted at lower temperatures, since the exothermic heat of the oxidation reaction evolved when a mixture of hydrocarbon vapors and an oxygen-containing gas is contacted with a vanadium oxide catalyst at temperatures above about 550° F. can produce runaway catalyst temperatures and the development of localized hot pots.

A bench scale study of the effect of sulfur dioxide on the oxidation of hydrocarbons by an oxygen-containing gas catalyzed by a vanadium oxide catalyst indicated that its employement produced results of considerable magnitude and significance. In order to firm up the bench scale data and to evaluate the commercial significance of the employment of sulfur dioxide in odixations of organic compounds catalyzed by vanadium oxide catalysts, the effect of sulfur dioxide was studied in a commercial plant. This plant was operated to produce phthalic anhydride from a mixed xylene feed containing 85% to 90% ortho xylene pursuant to the teaching of Levine patent Serial No. 2,438,369. The plant employed a plurality of tubular oxidation reactors. Each reactor contained a large number of catalyst tubes packed with vanadium pentoxide supported on a non-porous inert support as the catalyst. The xylene feed was charged to each reactor at a rate of about 31 gallons per hour. The xylenes were oxidized by air charged to each reactor at the rate of 5400 pounds per hour. A molten eutectic mixture of inorganic salts was circulated through the reactors in indirect heat exchange with the catalyst tubes to transfer the exothermic heat of reaction from the reactors. The molten salt was employed at a temperature of about 850° F.

Preliminary experiments were run in which 2 pounds per hour of sulfur dioxide were charged to a reactor containing catalyst which had been in use for a period of about 11 months. These runs were made to determine whether the sustained employment of the sulfur dioxide had any adverse effect on catalyst activity, feed conversion rate, or quality of the product. No adverse effects were observed during a run which extended over a period of two weeks. Following the successful preliminary runs, sulfur dioxide was charged at the rate of 2 pounds per hour to a reactor containing a fresh catalyst charge. The catalyst was employed in the reactor for a period of two weeks prior to initiating the introduction of sulfur dioxide in order to establish the temperature pattern in the catalyst bed and yield product quality figures. At the end of the two weeks' period, sulfur dioxide was introduced into the reactor together with the xylene feed and air at the rate of 2 pounds per hour. A number of the catalyst tubes in the reactor was equipped with thermocouples at several levels in the catalyst bed. Each catalyst tube in the reactor was packed with the supported vanadium pentoxide catalyst to a depth of 19 inches. The temperature profile of the catalyst bed was determined with and without sulfur dioxide. These temperature profiles are graphically represented on the appended drawing, in which catalyst temperature is plotted against catalyst bed depth. Each point on the curves in the drawing represents the temperature of the catalyst at a particular depth in the catalyst bed. Curve 1 of the drawing is the temperature profile of the catalyst bed during operation without sulfur dioxide. The temperature of the salt bath at the time when the graphically represented observations were made was at 846° F. It will be noted that curve 1 shows a very abrupt rise in temperature from 830° F. to 1020° F. in a 4-inch segment of the catalyst bed between the 3-inch level and the 7-inch level. The first 5 inches of the catalyst bed are at temperatures below 900° F., as are the last 7 inches of the bed. Somewhat less than 5 inches of the total bed depth are at temperatures above 950° F. This temperature profile clearly indicates the narrowness of the zone in which the major portion of the exothermic heat of reaction is released and that a considerable portion of the catalyst bed is at temperatures too low for effective use in the oxidation process.

Curve 2 of the appended drawing represents the temperature profile of the catalyst bed at the same feed rate, air rate, and salt temperature which prevailed during the collection of the data for curve 1, but charging sulfur dioxide to the reactor with the feed and air at a rate of two pounds per hour. It will be noted that the temperature profile in curve 2 is much smoother than that in curve 1, and that a substantially larger portion of the catalyst bed is at temperatures above 950° F. The effect of the sulfur dioxide on the temperature profile is obviously one of considerable magnitude. It should be noted that whatever the explanation of this effect may be, it cannot be attributed to absorption of heat by the sulfur dioxide introduced into the reactor. Only 2 pounds of sulfur dioxide per hour were introduced together with 5400 pounds of air and about 220 pounds of xylene feed. Unavoidable fluctuations in the air rate alone would have a much greater effect on the catalyst temperature profile by reason of mere heat capacity of the gas than 2 pounds of sulfur dioxide per hour could possibly have.

After the data upon which curve 2 is based had been collected, it was concluded that with the use of sulfur dioxide the reactor could be safely operated at a considerably higher salt temperature in order to boost the over-all temperature profile and maintain a greater segment of the catalyst bed at temperatures above 950° F. and in the range about 950° F. to 1050° F. The data for curve 3 were collected at a salt temperature of 877° F. It will be noted that at this higher salt temperature the temperature profile of the catalyst bed is approximately parallel to the temperature profile illustrated by curve 2, and that approximately 11 inches of the catalyst bed is at effective temperatures for oxidation above 950° F.

It should be noted that the temperatures obtained in the catalyst tubes equipped with thermowells may be expected to be lower than those in the catalyst tubes, not so equipped, by perhaps as much as 50° F. to 75° F. due to the difference in the heat transfer characteristics of tubes equipped with thermowells and tubes not so equipped.

The smoothing of the temperature profile of the vanadium oxide catalyst has very significant process implications. When the vanadium oxide catalyst, especially fresh catalyst, is employed without the modifying effect of sulfur dioxide, it is frequently necessary to cut back on the feed rate to the reactor in order to control the maximum hot spot temperature. As a result of the frequency and the length of these periods of reduced feed rate, the throughput of each reactor is significantly reduced. On the basis of commercial scale experience, it is conservatively estimated that the throughput of a given reactor may be increased by 8 to 12% by the employment of sulfur dioxide. During an extended run with a reactor employing 2 pounds per hour of sulfur dioxide, xylenes were charged at an average rate of 6880 pounds per calendar day. During the same period, a reactor of identical design employing the same catalyst, but without sulfur dioxide, had an average throughput of 6240 pounds per calendar day. In one run with a commercial reactor employing sulfur dioxide at the rate of 2 pounds per hour, xylenes were fed at an average rate of 45 gallons per hour during a period of more than one month of continuous operation. During the same period, the xylene rate to the other reactors not charging sulfur dioxide was 30.5 gallons per hour. These latter figures cannot be taken as a firm quantitative comparison of operation with and without sulfur dioxide because feed rates were periodically cut back on some of the reactors during the run because of haybarn capacity limitations. The figures, however, give a significant directional indication of the effect of the employment of sulfur dioxide, pursuant to the invention, on reactor throughout.

The employment of sulfur dioxide in vapor phase oxidation of organic compounds by air in contact with a vanadium oxide catalyst pursuant to this invention has a further favorable effect on reactor throughput which is obtained as follows: Instead of raising the cooling salt temperature when sulfur dioxide is used in the manner described above in reference to the commercial tests, the coolant temperature is held constant at about 850° F. and the air-hydrocarbon in the reactant mix charged to the reactor is reduced. The richer feed mixture is oxidized with a greater release of exothermic heat of reaction which brings a substantial segment of the catalyst bed to temperatures above 950° F. and in the range about 950–1050° F.

Sulfur dioxide has been found effective with either fused vanadium pentoxide or with vanadium pentoxide supported on materials such as pumice, alumina, aluminum, silicon carbide, and the like. The catalysts described in U. S. Patents Nos. 2,438,369, 2,474,001 and 2,474,002 are especially rugged vanadium oxide catalysts and are thoroughly responsive to treatment with sulfur dioxide pursuant to this invention.

While commercial scale observation of the effect of sulfur dioxide on the temperature profile on vanadium oxide catalyst has been limited to a process in which ortho xylene is oxidized to phthalic anhydride, bench scale experiments indicate that a similar smoothing of the temperature profile of the catalyst is obtained in other oxidation reactions set forth hereinabove. It is of interest to note that in the oxidation of naphthalene to phthalic anhydride, the temperature profile has in several instances been observed to have two peak points. It has been theorized that these peaks occur at points in the catalyst bed where naphthalene is oxidized to naphtho quinone and where naphtho quinone is oxidized to phthalic anhydride. Sulfur dioxide exercises a smoothing effect on both of these peaks.

Bench scale work indicates that the amount of sulfur dioxide employed may be varied between 0.01% and 15% by weight based on the organic material undergoing oxidation and the smoothing of the temperature profile obtained. In commercial scale experiments, sulfur dioxide has been charged at rates from ½ pound per hour to 7 pounds per hour to a reactor charging about 210 pounds of mixed xylenes and 5400 pounds of air per hour, and within these ranges the smoothing of the temperature profile was obtained.

Sulfur dioxide should only be employed in oxidations in which the oxygen-containing gas is employed in such amounts that the reactant mixture contains a large stoichiometrical excess of oxygen. It has been observed that when sulfur dioxide alone is passed over a vanadium oxide catalyst of temperatures of 800° F. and above, the catalyst is inactivated for appreciable periods of time.

I claim:

1. In a process for the production of oxygenated organic compounds by passing a vaporized hydrocarbon and an oxygen-containing gas in stoichiometrically excessive amounts through a bed of a vanadium oxide catalyst at a temperature above about 550° F. wherein the temperature profile of the catalyst bed is characterized by a sharply defined peak in a relatively narrow segment of the catalyst bed, the method of smoothing the temperature profile of the catalyst bed which comprises passing a quantity of sulfur dioxide gas in the range of about 0.01% to 15% based on the hydrocarbon through the catalyst bed together with the hydrocarbon vapor and oxygen-containing gas during the oxidation.

2. The method as defined in claim 1 wherein the hydocarbon is an aromatic hydrocarbon.

3. The method as defined in claim 1 wherein the hydrocarbon is an ortho dialkyl benzene.

4. In a process for the production of phthalic anhydride by passing at least one material selected from the group consisting of naphthalene, phenanthrene, indene, and ortho xylene and an oxygen-containing gas in stoichiometrically excessive amounts through a bed of a vanadium oxide catalyst at maximum catalyst temperatures in the range about 800° F. to 1200° F., the method of smoothing the temperature profile of the catalyst bed which comprises passing from about 0.01% to 15% by weight of sulfur dioxide based on the hydrocarbon charged through the catalyst.

5. In a process for the oxidation of hydrocarbons by passing the vaporized hydrocarbon and a stoichiometric excess of an oxygen-containing gas through a bed of a vanadium oxide catalyst, the method of avoiding excessive hot spot temperatures and maintaining a relatively smooth temperature profile in the catalyst bed during the break-in of a fresh vanadium oxide catalyst, which comprises contacting the vaporized organic compound and the oxygen-containing gas with the catalyst at a temperature above 550° F. and in the presence of from about 0.01% to 15% by weight based on the hydrocarbon of sulfur dioxide during the oxidation.

6. In a process for the oxidation of aromatic hydrocarbons by passing the vaporized hydrocarbon and a stoichiometric excess of a free-oxygen-containing gas through a bed of a vanadium oxide catalyst at an elevated temperature above 550° F., the method of smoothing the temperature profile of the catalyst bed which comprises passing sulfur dioxide through the catalyst bed together with the hydrocarbon and oxygen-containing gas, the amount of the sulfur compound calculated as equivalent sulfur dioxide being from about 0.01 to 15% by weight of the hydrocarbon.

7. In a process for the oxidation of naphthalene to phthalic anhydride by passing the vaporized naphthalene and a stoichiometric excess of a free-oxygen-containing gas through a bed of vanadium oxide catalyst at an elevated temperature in the range about 800° F. to 1200° F., the method of smoothing the temperature profile of the catalyst bed which comprises passing sulfur dioxide through the catalyst bed together with the naphthalene and oxygen-containing gas, the amount of sulfur dioxide being from about 0.01 to 15% by weight of the hydrocarbon.

WILLIAM G. TOLAND, JR.

REFERENCES CITED

The following references are of record in the file of this patent:

FOREIGN PATENTS

| Number | Country | Date |
|--------|---------|------|
| 518,823 | Great Britain | 1940 |